UNITED STATES PATENT OFFICE.

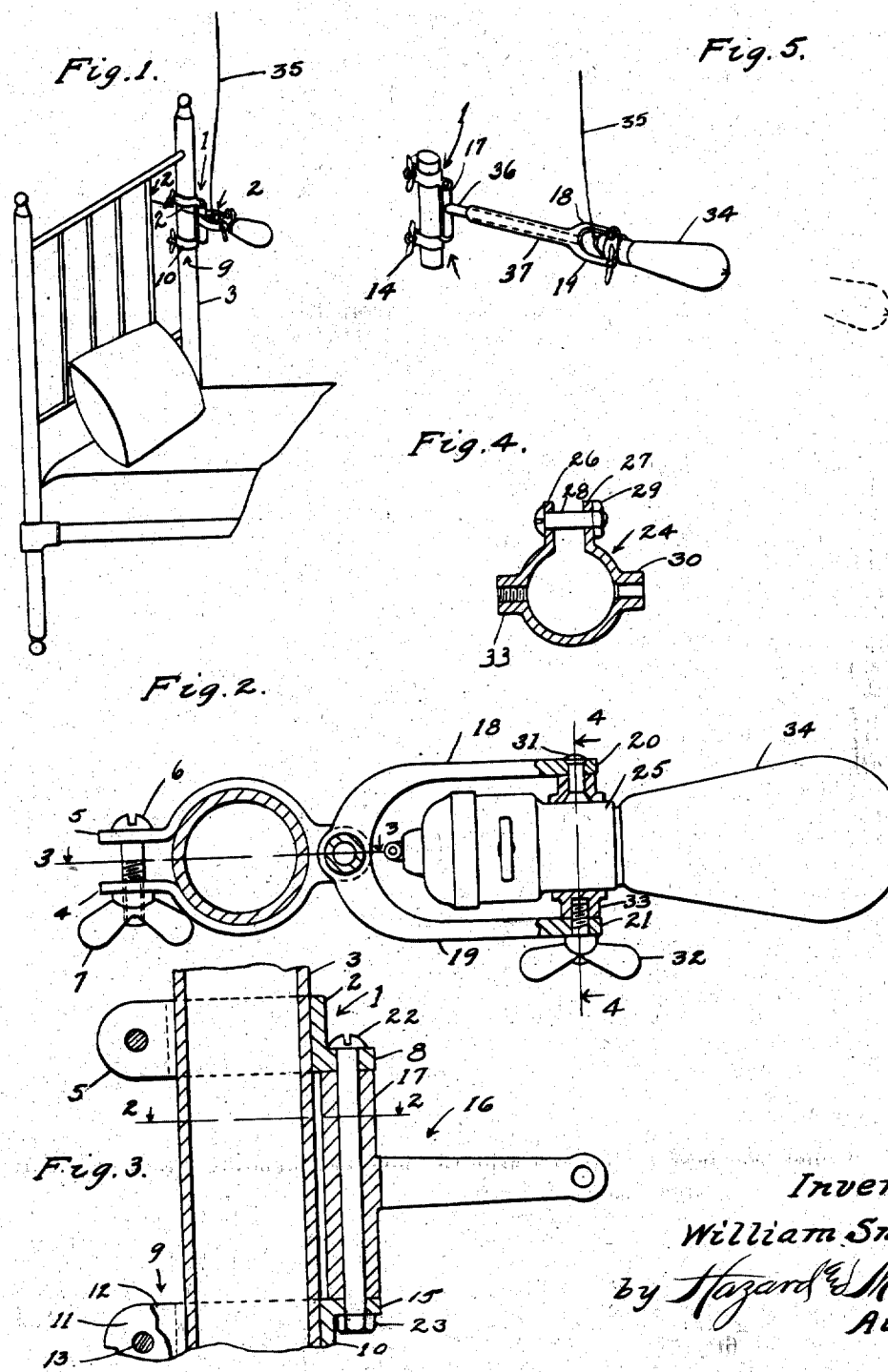

WILLIAM SMITH, OF LOS ANGELES, CALIFORNIA.

UNIVERSAL-JOINT LAMP-SUPPORT.

1,280,095. Specification of Letters Patent. Patented Sept. 24, 1918.

Application filed December 11, 1917. Serial No. 206,701.

*To all whom it may concern:*

Be it known that I, WILLIAM SMITH, a citizen of the Netherlands, residing at Los Angeles, in the county of Los Angeles and State of California, have invented new and useful Improvements in Universal-Joint Lamp-Supports, of which the following is a specification.

My object is to make a universal joint lamp support which may be readily applied and adjusted upon a post, such as a bed-post or the like, and to which the lamp may be readily applied or removed, and my invention consists in the novel features herein shown, described and claimed.

Figure 1 is a perspective showing a universal joint lamp support embodying the principles of my invention, with the lamp in position for use upon a bed-post.

Fig. 2 is an enlarged horizontal section on the line 2—2 of Fig. 1.

Fig. 3 is a vertical sectional detail on the line 3—3 of Fig. 2.

Fig. 4 is a cross-sectional detail through the lamp socket clamp on the line 4—4 of Fig. 2.

Fig. 5 is a perspective analogous to Fig. 1, showing an extension supporting arm for the fork.

The supporting clip 1 comprises a band 2 adapted to encircle the supporting post 3, ears 4 and 5 extending from the ends of the band, the bolt 6 inserted through the ears, the wing-nut 7 upon the bolt for pulling the ears 4 and 5 together to tighten the band *a* upon the post, and the supporting arm 8 extending from the lower edge of the band 2 and at the opposite side of the band from the ears 4 and 5. In a like manner, the clip 9 comprises the band 10, the ears 11 and 12 extending from the ends of the band, the bolt 13 inserted through the ears 11 and 12, the wing-nut 14 upon the bolt 13 for pulling the ears 11 and 12 together to clamp the band 10 upon the post 3, and the arm 15 extending from the upper edge of the band 10 parallel with the arm 8 and at the opposite side of the band from the ears 11 and 12.

The swinging frame 16 comprises the bearing bar 17 fitting between the arms 8 and 15, and the forks 18 and 19 extending from the central portion of the bearing bar 16 and having alined bearings 20 and 21 in their ends. A bolt 22 is inserted downwardly through the arm 8, and through the arm 15 and has a clamping nut 23 upon its end, so that by manipulating the nut 23 the joint between the swinging frame and the clips 1 and 9 may be stiffened to any desired extent.

The lamp socket clamp 24 is a split band adapted to encircle and grip the lamp socket 25, there being ears 26 and 27 extending from the ends of the band and a bolt 28 inserted through the ears and a clamping nut 29 upon the end of the bolt so as to tighten the band 24 upon the socket 25. A bearing 30 extends from the band 24 at right angles to the ears 26 and 27, and a rivet or bolt 31 is inserted through the bearing 30 and through the bearing 20 to secure the clamp pivotally and permanently in position between the ends of the forks 18 and 19. A wing-screw 32 is inserted through the bearing 21 and screw-seated in the bearing 33 extending from the band 24 diametrically opposite the bearing 30 so that by manipulating the wing-screw 32 the joint between the lamp socket 25 and the forks 18 and 19 may be stiffened to any desired extent. The lamp 34 is removed from the socket 25, the nut 29 manipulated to loosen the clamp 24, and the socket 25 is inserted through the clamp 24 and then the lamp 34 is replaced in the socket. The lamp socket 25 is of the usual construction and is attached to the lamp cord 35.

In the modification shown in Fig. 5, the arm 36 extends from the bearing bar 17 and a socket 37 extends from the forks 18 and 19, said arm 36 telescoping into the socket 37 so that the lamp 34 may be moved to and from the bearing bar 17.

By manipulating the nuts 7 and 14 the clips 1 and 9 may be adjusted longitudinally upon the post 3 and this post may be a corner bed-post, as shown, or any other suitable bar standing either vertically or horizontally. The bands 2 and 10 are sufficiently flexible to allow the clips to be applied to posts varying considerably in size and to allow the ears to be opened wide enough to snap the clips over the posts. The lamp swings to and fro upon the axis of the bolt 22 and at right angles to this axis upon the axis of the rivet 31 and screw 32, and the lamp moves to and from the supporting post by the sliding of the socket 37 upon the arm 36.

Various changes may be made in the details of construction without departing from the spirit of my invention as set up in the following claims.

I claim:

1. A universal joint lamp support comprising two flexible clips, bolts inserted through the free ends of the clips, wing-nuts upon the bolts, arms extending from the clips, a swinging frame mounted between the arms, a bolt inserted through the arms and through the swinging frame, a nut upon the bolt for tightening the arms against the frame, and a lamp socket clip carried by the swinging frame.

2. A universal joint lamp support comprising two flexible clips adapted to embrace a post, bolts inserted through the free ends of the clips, wing-nuts for tightening the clips upon the post, arms extending from the clips, a swinging frame mounted between the arms, a bolt inserted through the arms and through the swinging frame for clamping the arms against the frame, and a lamp socket clip pivotally carried by the frame.

3. A universal joint lamp support comprising two flexible clips adapted to embrace a post, bolts inserted through the free ends of the clips, wing-nuts upon the bolts, arms extending from the clips, a bearing bar mounted between the arms, a bolt inserted through the arms and bearing bar, forks carried by the bearing bar, and a lamp socket clamp pivotally mounted between the forks.

4. A universal joint lamp support comprising two flexible clips adapted to embrace a post, bolts inserted through the free ends of the clips, wing-nuts upon the bolts, arms extending from the clips, a bearing bar mounted between the arms, a bolt inserted through the arms and bearing bar, forks telescopically connected to the bearing bar, and a lamp socket clamp pivotally mounted between the forks.

In testimony whereof I have signed my name to this specification.

WM. SMITH.